United States Patent
Fuller et al.

(10) Patent No.: US 6,348,243 B1
(45) Date of Patent: *Feb. 19, 2002

(54) CONTAINER STOPPERS

(75) Inventors: Jess P Fuller, Colville; David B Orr, Chilfrome, both of (GB); Steven J Watkins, Vila Nova de Gaia (PT)

(73) Assignees: Jess Paul Fuller, Leiestershire; David Bodley Orr, Chilfrome, both of (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,935
(22) PCT Filed: Sep. 27, 1996
(86) PCT No.: PCT/GB96/02398
§ 371 Date: Jun. 29, 1998
§ 102(e) Date: Jun. 29, 1998
(87) PCT Pub. No.: WO97/11894
PCT Pub. Date: Apr. 3, 1997

(30) Foreign Application Priority Data

Sep. 28, 1995 (GB) .............................. 9519972

(51) Int. Cl.⁷ ................................. B06B 1/20
(52) U.S. Cl. ................ 427/601; 427/242; 427/307; 427/308; 427/323; 427/324; 427/439; 427/442; 427/560; 427/600

(58) Field of Search .................................. 427/600, 601, 427/560, 439, 442, 242, 307, 308, 323, 324

(56) References Cited

U.S. PATENT DOCUMENTS 3,467,546 A * 9/1969 Page et al. .................... 427/601
4,552,781 A * 11/1985 Cannady et al. ............. 427/601

FOREIGN PATENT DOCUMENTS

| AU | 18555/83 | 3/1984 | |
| AU | 47995/85 | 4/1986 | |
| DE | 1 642 205 | 10/1970 | |
| DE | A1642204 | 1/1971 | |
| DE | A2336841 | 2/1975 | ........... B65D/45/00 |
| EP | 0 277 603 | 8/1988 | |
| EP | 0 515 806 | 12/1992 | |
| FR | A2045039 | 2/1971 | ........... B65D/39/00 |
| GB | A851578 | 10/1960 | |
| WO | WO A9628378 | 9/1996 | ............. B67B/1/03 |

* cited by examiner

Primary Examiner—Bernard Pianalto
(74) Attorney, Agent, or Firm—McCormick, Paulding & Huber LLP

(57) ABSTRACT

A cork stopper for a wine bottle or the like is coated with, for example, silicone rubber to prevent impurities in the cork from contaminating the contents of the bottle. The coating may be applied by dipping or immersion preferably with ultrasonic agitation to improve penetration of the coating material into the cork pores. Prior to coating, the corks may be soaked in a solvent to leach out taint compounds from the surface of the cork, thereby reducing the likelihood of such compounds concentrating on the coating surface.

9 Claims, 1 Drawing Sheet

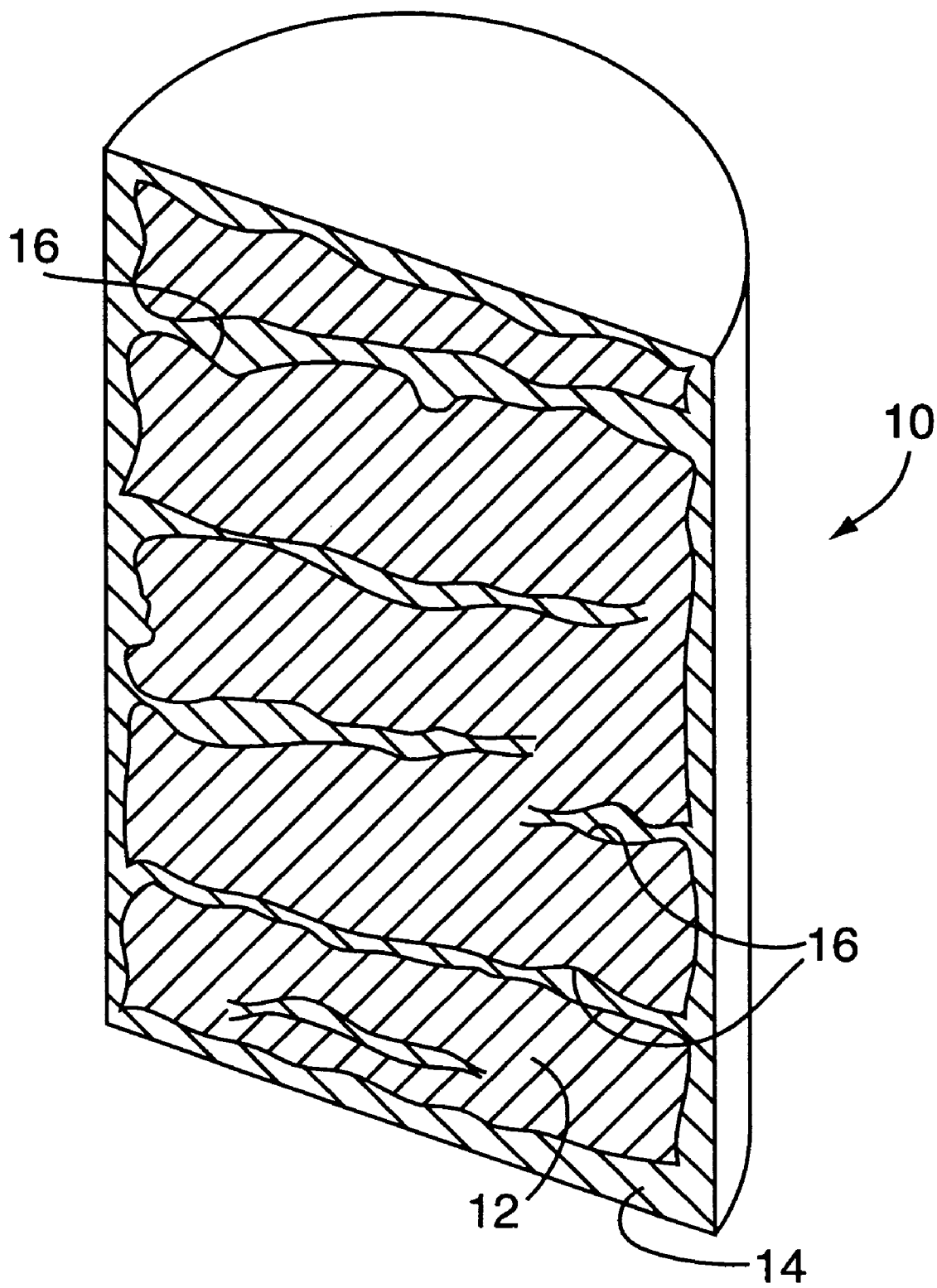

CONTAINER STOPPERS

FIELD OF THE INVENTION

The present invention relates to improved container stoppers and particularly but not exclusively to improved cork stoppers for bottles of wine.

BACKGROUND OF THE INVENTION

Conventionally cork stoppers are used to stop bottles of wine and generally provide effective seals and maintain wine in good condition. However, the use of cork stoppers can introduce the problem of giving the wine a "cork taint". Cork taint occurs when the wine in the bottle becomes contaminated resulting in poor quality and often unpalatable wine.

It is believed that a major source of cork taint is derived from the activity of microorganisms located in the cork, which metabolise substances, such as bleaching agents remaining in the cork following preparation of the cork, in the presence of moisture (which may be present naturally in the cork or leach into the cork from the wine after bottling) to produce contaminants, which leach into the wine.

Attempts at obviating the problem of corking have included using stoppers of plastics material. However, these do not exhibit several of the advantages of cork stoppers and have been received unfavourably by the public, who tend to prefer the conventional cork stoppers.

The elimination of the microorganisms from the cork has also been suggested. However, while this may be feasible, it is not a practical solution since it has not yet been established at which stage or stages in the production process taint compounds or their precursors can arise, and the process environment is such that recontamination would very likely occur.

It is an object of the present invention to provide an improved stopper for wine bottles and the like.

SUMMARY OF THE INVENTION

According to the present invention there is provided a method of treating a stopper comprising a body of cork or cork derivative comprising the step of coating the body with a substance for substantially preventing impurities in the body from contaminating the contents of a container stopped with the stopper, wherein the body is immersed or dipped in a bath of the coating substance, and characterised in that the cork body and/or coating substance are agitated or vibrated ultrasonically during coating.

The immersion of the body in a bath of the coating substance and the ultrasonic agitation or vibration of the cork body and/or coating substance will allow the substance to penetrate more deeply into the cork body.

Preferably the substance substantially prevents contact between microorganisms and/or products of microbial metabolism in the stopper and the contents, such as a liquid, in a container stopped with the stopper. The stopper may provide for gaseous communication between the inside and outside of a container therethrough.

Preferably the substance is transparent or translucent thereby substantially not affecting the appearance of the body.

Preferably the substance comprises silicon or a derivative thereof, for example silicone oil, and is most preferably silicone rubber.

Preferably the substance is applied to the body in the form of a dispersion or solution. In the preferred embodiment, the substance is a silicone rubber such as dimethyl-polysiloxane dissolved or dispersed in a low polarity solvent such as xylene or toluene. Silicone rubber is readily dispersable in such solvents, and this will allow a uniform coating more easily to be deposited on the body. After coating, the solvent is evaporated and the coating cured to provide a vulcanised protective layer.

Preferably the stopper is for stopping a bottle of wine. As mentioned above, production of cork stoppers for wine bottles involves several steps, including bleaching of the cork. It is believed that the residual bleaching agent left in the cork after treatment, and moisture (either the natural moisture content of the cork or moisture seeping into the cork from the wine after bottling) are metabolised by micro-organisms present in the cork to produce so-called "taint compounds" which may then leach into the wine and thereby adversely affect the flavour of the wine.

Preferably therefore, the coating is operable to prevent these taint compounds leaching into the wine thereby preventing production of a cork taint in wine in the container. It may additionally be effective to prevent moisture from soaking into the cork from the filled bottle, which might otherwise initiate production of the taint compounds. A silicone rubber coating as discussed above would satisfy both these requirements.

The major taint compounds produced in cork have been identified as chlorinated phenols, which will dissolve in wine to give an unpalatable flavour to the wine. A major taint compound which has been identified is 2, 4, 6, trichloroanisole (2, 4, 6 TCA). Such taint compounds may well be soluble in the solvents used in dissolving or dispersing the coating substance, which may mean that during the coating process, taint compounds present on or in the surface of the cork body may dissolve into the solvent mixing with the coating substance. When the solvent is then evaporated, for example during vulcanisation, it is possible that the taint compounds may concentrate on or in the coating surface or loosely associate with the coating structure whereby it may leach out into and contaminate the container contents.

Accordingly, in a preferred method of the invention, the cork body is treated with a solvent to leach out taint compounds from at least a surface region thereof prior to coating with the coating substance.

From a further broad aspect therefore, the invention also provides a method of treating a stopper comprising a body of cork or cork derivative comprising the steps of treating the body with a solvent to dissolve taint compounds in at least a surface region thereof, and coating the treated body with a substance to prevent substantially impurities in the cork or cork derivative from contaminating the contents of a container stopped with the stopper.

Preferably the solvent used for the pre-treatment is one in which the taint compound is highly soluble. For example with the taint compounds mentioned above, whilst it would be possible to use ethanol as a solvent, it is preferred to use a low-polarity solvent such as xylene or toluene in which the taint compounds are more soluble.

The solvent may be applied to the cork body by spraying, but most preferably the cork body is soaked in the solvent, for example by dipping or immersion, to allow the solvent more effectively to penetrate the surface and draw out the contaminants. Typically the body may be immersed for between 5 and 15 minutes, say 10 minutes. Indeed a dip of say 10 minutes is likely to penetrate the cork body and draw out readily leachable taint compounds from the surface and from the depth of the pores in the cork body.

To improve the penetration of the solvent into the pores of the cork body, the body and/or solvent may be agitated or vibrated, most preferably ultrasonically, for example by immersion of the body in an ultrasonic bath containing solvent. This acts to assist in displacing air from the pores, thereby improving solvent penetration.

After the pre-soaking treatment, the cork body may be rinsed with the same or a different solvent to ensure that no taint compounds remain on the body surface before coating, as might happen if, for example, the pre-soaking solvent has been used for some time and thereby contain substantial amounts of dissolved taint compounds. Typically the rinsing solvent may be sprayed onto the body. The solvent is then preferably evaporated prior to the coating step.

In the main coating step, the body may be immersed in a solution or dispersion of the coating substance typically for between 1 and 5 minutes, for example around 1 and 2 minutes. The exact time will be dependent upon the nature of the solvent, the porosity of the cork body and so on, but should be long enough to allow a satisfactory coating to be deposited on the body surface. Typically a rubber coating of between 10–20 $\mu$m may be deposited.

To improve penetration of the coating into the pores of the cork body, the coating substance and/or the cork body is agitated or vibrated ultrasonically. Accordingly in a preferred embodiment, the cork body may be immersed in an ultrasonically vibrated bath containing the coating material. The ultrasonic vibration helps displace air from the pores of the cork body to allow the coating to penetrate more deeply into the cork body. The coating substance may be held directly within an ultrasonic bath, but it may be preferable to hold it in a separate container arranged within an ultrasonic bath, so that it can be isolated thermally from the bath, thereby preventing possible premature curing of the substance. The bath may itself contain water or the like which could be circulated to improve cooling.

After the stopper body has been coated, solvent may be evaporated from the body and, if the coating is rubber for example, the coating cured. The particular temperature and duration of curing will vary depending on the coating substance used but typically, it might be carried out at a temperature of 70°–80° C. for 15–20 minutes or longer. To ensure that the solvent evaporates or disperses completely, the cork may be left for a substantial period, for example 12 hours or more preferably 24 hours before the next process step.

After the coating has been cured and solvent evaporated, the coated body may, if required, be rinsed again with a solvent to dissolve any taint compounds which may have crystallised on the coating surface. Preferably the solvent is sprayed onto the body. The solvent used may, for example, again be xylene or the like. Preferably the solvent should not react with the coated surface and should dissolve the compounds quickly. Quite clearly also, the solvent should be easily removable from the body after use, and be food-safe. Also, the cork body may be left for a substantial period, as above to allow the rinse solvent to evaporate fully.

BRIEF DESCRIPTION OF THE DRAWINGS

An embodiment of the present invention will now be described by way of example only with reference to the accompanying drawing, which shows a diagrammatic cross-section of a stopper according to the present invention.

DETAILED DESCRIPTION OF THE PREFERRED EMBODIMENTS

Referring to the drawing there is provided a stopper 10 for a wine bottle, the stopper comprising a cork body 12 encapsulated in a coating 14 which substantially prevents microorganisms or products of their metabolism in the cork body 12 from contaminating wine in a bottle stopped with the stopper 10.

In more detail, the cork body 12 is of conventional shape and size, and is produced using conventional techniques. Production of cork stoppers involves many steps, including bleaching of the cork. Some of the bleaching agent(s) used remain in the cork body, and are believed to be involved in contamination of wine in corked bottles, resulting in the wine adopting undesirable qualities, such as a musty aroma and flavour (cork taint), often rendering the wine unpalatable. The contaminants producing the taint are metabolites produced by microorganisms in the cork body 12 using the bleaching agents and other possible impurities as substrates, usually along with the natural moisture content of the cork or moisture provided by the wine or natural moisture content. These metabolites leach into the wine after bottling.

The coating 14 is of silicone rubber and as shown in the diagram enters and substantially fills the pores 16 in the cork structure. The degree of impregnation of the coating 14 into the pores 16 in the cork body 12 may for example be controlled by controlling the consistency of the silicone rubber dispersion.

The coating 14, in use in stopping a bottle of wine, substantially prevents contact between the microorganisms in the cork body 12 and moisture from the wine, and thus may prevent the production of taint compounds in the stopper. Moreover, the coating 14 substantially prevents microorganism products (metabolites) present in the stopper from leaching into the wine to cause a cork taint.

Since a relatively thin coating is provided, the appearance of the stopper 10 is almost identical to an uncoated cork stopper, and therefore has the same appeal to the public as an uncoated cork, whilst providing the aforementioned advantages.

In one preferred method of manufacture, a silicone rubber coating may be produced on the cork body as follows.

Firstly, a cork stopper is immersed in a bath of xylene solvent for about 10 minutes. The cork may be agitated during immersion, and may be moved through the bath in a continuous manner during soaking. This step dissolves and draws out taint compounds, and in particular 2, 4, 6 TCA, from a surface layer and form the pores of the cork stopper.

After immersion, the cork stopper is removed from the bath and sprayed with further xylene to wash away any residual taint compounds left on the surface of the stopper and also any pre-soak solvent which might contain dissolved taint compounds.

The stopper is then immersed in an ultrasonic bath containing coating compound. The coating compound is a 20% dispersion in xylene of the silicone rubber compound RTV615 produces by General Electric. The stopper is immersed for approximately 1½ minutes during which time the cork body and coating compound are ultrasonically vibrated, whereafter the deposited coating is cured at an appropriate temperature for an appropriate time, for example 70°–80° for 20–25 minutes, to produce a cured silicone rubber coating of typically about 15 $\mu$m thickness.

Finally, the cured coated stopper is rinsed by spraying with further xylene, or some other solvent to remove any residual taint compounds on the coating surface. The xylene or other solvent is then evaporated to leave the cork ready for use.

It will be appreciated that although a particular embodiment has been described above, this is purely non-limiting example and that, variations for example to the materials used and the process steps described, may be made within the scope of the invention.

For example a pre-soaking step may be found to be unnecessary in some cases. Further, by controlling application of the coating, the degree of impregnation of the coating into the cork body structure 12 may be controllable. For example, the use of a relatively thick dispersion and a short application time may result in a stopper 10 with a coating 14 which has not impregnated the structure of the cork body 12 to the same degree as that that would be achieved by the application of a relatively thin dispersion over a longer period of time.

Also curing may be at elevated temperature, or at room temperature depending upon the particular rubber compounds used. The length of curing time may also be varied depending on the particular materials used.

It is to be appreciated that it may be possible for other coatings to be employed which provide the same advantages as a silicone rubber coating.

Furthermore, the stopper of the invention may equally be applicable to containers of other materials, especially liquid foodstuffs and beverages such as spirits, oils and vinegars etc.

What is claimed is:

1. A method of applying a thin surface sealing coating to a stopper comprised of a body of cork or cork derivative to prevent impurities in the body from escaping the body and contaminating the contents of a container stopped with the stopper, said body having pores and an outer surface, said method comprising:

coating the body with a thin coat of silicone rubber by immersing the body for at least one minute in a quantity of coating material made up of transparent or translucent silicone rubber dissolved or dispersed in a solvent, ultrasonically agitating the body and/or the coating material during the immersion to displace air from the pores of the body and to produce a deposited coating of the coating material on the outer surface of the body, removing the body from the quantity of coating material, and evaporating solvent from the deposited coating and curing the silicone rubber of the deposited coating to obtain a final coating of cured silicone rubber on the outer surface of the body which final coating completely seals the body and has a thickness of 20 $\mu$m or less so as to not substantially affect the appearance of the body.

2. A method as claimed in claim 1 wherein the quantity of coating material is held directly within an ultrasonic bath.

3. A method as claimed in claim 1 wherein the quantity of coating material is contained in a separate container arranged within an ultrasonic bath.

4. A method as claimed in claim 1 wherein after the curing of the silicone rubber on the outer surface of the body, the coated body is rinsed with a solvent to dissolve any taint compounds which may have crystallized on the surface of the final coating.

5. A method as claimed in claim 1 wherein the cork body is treated with a solvent to leach out taint compounds from at least a surface region thereof prior to coating with the coating substance.

6. A method as claimed in claim 1 wherein said quantity of coating material is a dispersion of silicone rubber in xylene.

7. A method as claimed in claim 1 wherein said quantity of coating material is an approximate 20% dispersion of silicone rubber in xylene.

8. A method as claimed in claim 6 wherein prior to the immersing of said body in the quantity of coating material the body is washed with xylene.

9. A method as claimed in claim 8 wherein after the curing of the silicone rubber on the outer surface of the body the coated body is washed with xylene.

* * * * *